US011030899B2

(12) United States Patent
Nemeth et al.

(10) Patent No.: US 11,030,899 B2
(45) Date of Patent: Jun. 8, 2021

(54) APPARATUS FOR PROVIDING VEHICULAR ENVIRONMENT INFORMATION

(71) Applicant: KNORR-BREMSE SYSTEME FUER NUTZFAHRZEUGE GMBH, Munich (DE)

(72) Inventors: Huba Nemeth, Budapest (HU); Viktor Tihanyi, Budapest (HU)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 2 days.

(21) Appl. No.: 16/326,772

(22) PCT Filed: Sep. 5, 2017

(86) PCT No.: PCT/EP2017/072161
§ 371 (c)(1),
(2) Date: Feb. 20, 2019

(87) PCT Pub. No.: WO2018/046464
PCT Pub. Date: Mar. 15, 2018

(65) Prior Publication Data
US 2019/0206250 A1 Jul. 4, 2019

(30) Foreign Application Priority Data
Sep. 8, 2016 (EP) .................................... 16187852

(51) Int. Cl.
*B60W 30/08* (2012.01)
*G08G 1/0962* (2006.01)
(Continued)

(52) U.S. Cl.
CPC ......... *G08G 1/09626* (2013.01); *B60Q 5/006* (2013.01); *B60Q 9/008* (2013.01);
(Continued)

(58) Field of Classification Search
None
See application file for complete search history.

(56) References Cited

U.S. PATENT DOCUMENTS

| 8,004,394 B2* | 8/2011 | Englander | B60Q 1/525 340/433 |
| 8,665,331 B2* | 3/2014 | Onaka | B60R 1/00 348/148 |

(Continued)

FOREIGN PATENT DOCUMENTS

| CN | 101902598 A | 12/2010 |
| CN | 101915990 A | 12/2010 |

(Continued)

OTHER PUBLICATIONS

International Search Report dated Dec. 1, 2017, of the corresponding International Application PCT/EP2017/072161 filed Sep. 5, 2017.

*Primary Examiner* — Jonathan M Dager
(74) *Attorney, Agent, or Firm* — Norton Rose Fulbright US LLP; Gerard Messina

(57) ABSTRACT

An apparatus for providing vehicular environment information, which includes acquiring with at least one sensor vehicular environment data that is external to a vehicle. The vehicular environment data is provided to a processing unit. The processing unit determines vehicular environment information, wherein the determination of the vehicular environment information includes using the vehicular environment data. The processing unit is also configured to provide at least a portion of a frame around an environment display monitor that is configured to provide information to a driver of the vehicle, on the basis of the vehicular environment information.

12 Claims, 3 Drawing Sheets

Color 1   Color 2

(51) Int. Cl.
  *B60R 1/00* (2006.01)
  *G08G 1/16* (2006.01)
  *H04N 7/18* (2006.01)
  *B60Q 9/00* (2006.01)
  *B60Q 5/00* (2006.01)
  *G06K 9/00* (2006.01)
  *H04N 5/225* (2006.01)
  *H04N 5/232* (2006.01)

(52) U.S. Cl.
  CPC ............ *B60R 1/00* (2013.01); *G06K 9/00671* (2013.01); *G08G 1/166* (2013.01); *G08G 1/167* (2013.01); *H04N 5/2253* (2013.01); *H04N 5/23293* (2013.01); *H04N 7/183* (2013.01); *B60K 2370/178* (2019.05); *B60K 2370/188* (2019.05); *B60K 2370/1868* (2019.05); *B60K 2370/193* (2019.05); *B60K 2370/332* (2019.05); *B60Q 2900/10* (2013.01); *B60R 2300/8093* (2013.01)

(56) References Cited

U.S. PATENT DOCUMENTS

| | | | |
|---|---|---|---|
| 9,073,482 B2* | 7/2015 | Yamamoto | B60R 1/00 |
| 9,333,915 B2* | 5/2016 | Nakanishi | E02F 9/261 |
| 9,487,139 B1* | 11/2016 | Ishida | B60W 30/08 |
| 9,697,735 B2* | 7/2017 | Michiguchi | G08G 1/168 |
| 10,650,787 B2* | 5/2020 | Kim | B60K 37/04 |
| 10,744,938 B1* | 8/2020 | Englander | B60Q 5/005 |
| 10,807,573 B2* | 10/2020 | Inoue | B62D 15/02 |
| 2003/0058337 A1* | 3/2003 | Tanaka | B60Q 9/005 |
| | | | 348/116 |
| 2003/0179293 A1* | 9/2003 | Oizumi | B60R 1/00 |
| | | | 348/148 |
| 2005/0278088 A1* | 12/2005 | Thorner | B60W 40/02 |
| | | | 701/28 |
| 2006/0088190 A1* | 4/2006 | Chinomi | B60R 1/00 |
| | | | 382/104 |
| 2006/0192660 A1* | 8/2006 | Watanabe | B60R 1/00 |
| | | | 340/435 |
| 2006/0274147 A1* | 12/2006 | Chinomi | G06T 3/4038 |
| | | | 348/118 |
| 2006/0287826 A1* | 12/2006 | Shimizu | B60Q 1/0023 |
| | | | 701/431 |
| 2008/0129539 A1* | 6/2008 | Kumon | B60R 1/00 |
| | | | 340/901 |
| 2009/0257659 A1* | 10/2009 | Suzuki | G06T 3/4038 |
| | | | 382/199 |
| 2010/0070139 A1* | 3/2010 | Ohshima | B60R 1/00 |
| | | | 701/42 |
| 2010/0194596 A1* | 8/2010 | Wang | B60R 1/00 |
| | | | 340/936 |
| 2010/0201896 A1* | 8/2010 | Ostreko | B60R 1/12 |
| | | | 349/1 |
| 2010/0253493 A1* | 10/2010 | Szczerba | G01S 13/723 |
| | | | 340/435 |
| 2010/0253540 A1 | 10/2010 | Seder et al. | |
| 2010/0253541 A1* | 10/2010 | Seder | G08G 1/165 |
| | | | 340/905 |
| 2010/0283591 A1* | 11/2010 | Schick | B60Q 9/008 |
| | | | 340/436 |
| 2011/0043632 A1* | 2/2011 | Satoh | H04N 5/2628 |
| | | | 348/148 |
| 2011/0228980 A1* | 9/2011 | Ichikawa | G06K 9/00805 |
| | | | 382/103 |
| 2012/0274737 A1* | 11/2012 | Kuboyama | G06T 3/0018 |
| | | | 348/36 |
| 2013/0010117 A1* | 1/2013 | Miyoshi | B60R 1/002 |
| | | | 348/148 |
| 2013/0010118 A1* | 1/2013 | Miyoshi | H04N 7/181 |
| | | | 348/148 |
| 2014/0347485 A1* | 11/2014 | Zhang | B60R 11/04 |
| | | | 348/148 |
| 2017/0066449 A1* | 3/2017 | Lee | B60G 17/019 |
| 2019/0061742 A1* | 2/2019 | Kubo | B60W 30/095 |
| 2019/0102634 A1* | 4/2019 | Sagami | G06K 9/00825 |
| 2019/0174060 A1* | 6/2019 | Oba | H04N 5/3572 |
| 2020/0051435 A1* | 2/2020 | Hashimoto | G06K 9/00805 |
| 2020/0101984 A1* | 4/2020 | Takahashi | B60W 40/06 |

FOREIGN PATENT DOCUMENTS

| | | |
|---|---|---|
| CN | 102300746 A | 12/2011 |
| CN | 102782740 A | 11/2012 |
| CN | 104210424 A | 12/2014 |
| CN | 105774656 A | 7/2016 |

* cited by examiner

| Warning level | Stage 1 (no frame) | Stage 2 (yellow frame) | Stage 3 (red frame) |
|---|---|---|---|
| Camera display | | | |
| Sound/Haptic | - | - | ))) Beep! /Haptic |
| Example Situation | | | |

Color 1   Color 2

APPARATUS FOR PROVIDING VEHICULAR ENVIRONMENT INFORMATION

FIELD OF THE INVENTION

The present invention relates to an apparatus for providing vehicular environment information, a vehicle having an apparatus for providing vehicular environment information electronically, and a method for providing vehicular environment information.

BACKGROUND INFORMATION

There are several existing solutions for environment sensing systems with driver notification functions in case of danger situations, for example when an obstacle is detected close to the vehicle. Different methods are applied for visualization of objects or application of audible or haptic feedbacks.

Patent document U.S. Pat. No. 9,333,915 discusses a controller that includes: a bird's eye image synthesizer generating bird's eye image information for displaying a bird's eye image of a work vehicle and a periphery of the work vehicle; a display controller displaying a first image in which a mark representing an object detected by radar devices overlaps the bird's eye image and a second image captured on the same screen of a monitor; an alarm notifying unit notifying, as the alarm, at least one of a first alarm of displaying a region with the mark differently from a region without the mark in the first image and a second alarm of notifying the existence of the object by a sound; and an alarm releasing unit releasing the alarm in accordance with a releasing order based on a position in which the object exists.

However, there is a need to provide driver notifications more effectively.

Therefore, it would be advantageous to have an improved technology for providing driver notifications.

SUMMARY OF THE INVENTION

An object of the present invention is solved with the subject matter of the independent claims, wherein further embodiments are incorporated in the dependent claims. It should be noted that the following described aspects of the invention apply also for the apparatus for providing vehicular environment information, the vehicle having an apparatus for providing vehicular environment information, and the method for providing vehicular environment information.

In an aspect, there is provided an apparatus for providing vehicular environment information. The apparatus comprises:

at least one environment display monitor;
at least one sensor; and
a processing unit.

The at least one environment display monitor is configured to provide information to a driver of a vehicle. The at least one sensor is configured to acquire vehicular environment data that is external to the vehicle. The at least one sensor is configured to provide the vehicular environment data to the processing unit. The processing unit is configured to determine vehicular environment information. The determination of the vehicular environment information comprises use of the vehicular environment data. The processing unit is configured to provide at least a portion of a frame around the environment display monitor on the basis of the vehicular environment information.

In other words, a display that is used to provide information to a driver of a vehicle can have a part of an outer frame, which could be the whole outer frame, displayed on the basis of what is happening outside of the vehicle as sensed by sensor(s). Thus, if there is determined to be a dangerous or potentially dangerous, or other situation that is developing such that a driver would want to be aware of it, an outer frame of a display that the driver is using, can indicate to the driver that that there is such a situation. In this way, if a cyclist for example is at the side of a lorry, the driver can be provided with information in a simple manner in a region that he normally looks at in order to be provided with information relating to the danger associated with that situation.

In an example, the apparatus comprises:
at least one input unit.

The at least one input unit is configured to acquire driver intention data. The at least one input unit is configured to provide the driver intention data to the processing unit. The determination of the vehicular environment information comprises use of the driver intention data.

In other words, the information provided to the driver, regarding a dangerous or potentially dangerous or other situation the driver would like to be informed about, can take into account what the driver intends to do. Thus, for example if a cyclist is at the right hand side of a lorry then the frame around a display the driver uses could indicate a certain level of risk or danger associated. Then, if the driver indicates with an indicator stick that he intends to turn right, and/or starts to turn the steering wheel to turn the vehicle to the right, the frame around the display can change to reflect the danger level or risk. Similarly if a car or bicycle was very close behind a lorry, and the driver started to brake, the frame around the display could change to indicate that there is a potential risk or danger developing.

In an example, the vehicular environment information comprises information relating to a region around the vehicle, and wherein a position of the region around the vehicle is correlated with a position of the portion of frame around the environment display monitor.

In other words sensor(s) can provide vehicular environment data for outside the vehicle, and this could relate to the front, front-left, left-side, rear-left, rear, rear-right, right, and front-right areas around the vehicle. Then, if for example it is determined that a bicycle is at the front-right area around the vehicle, a frame at the top-right position of a display the driver is using could indicate that there is something at that area around the vehicle that requires his attention or that he should be aware of. There can then be more than one portion of frame presented around the environment display monitor. For example, the drive may be reversing and the rear left of the lorry is close to a wall, and a frame is provided around the bottom left part of the environment display monitor. However, as he reverses and the cab of the lorry is moving to the right the front right hand side of the cab approaches a bollard and a frame around the top right hand side of the environment display monitor appears in addition to the other portion of frame, to indicate that a situation is developing at the front right hand side of the vehicle.

In an example, the vehicular environment information comprises information relating to a level of risk, and wherein the level of risk is correlated with a mode of display of the portion of frame around the environmental display monitor.

In other words, as a level of risk develops, the frame can change accordingly. The frame could become brighter, or become darker, or change color, or become thicker, or could start to extend around more of the display as a determined level of risk increases, and the opposite can occur if the level of risk decreases.

In an example, the mode of display comprises a change in color comprising at least one color.

In other words, the frame could be orange if there is something that the driver should be aware of, for example a bicycle next to his lorry. If however, the driver starts to turn towards the bicyclist or the bicyclist starts to deviate towards the lorry, the frame could change from orange to red. The frame could change from black to having a color.

In an example, the at least one sensor comprises at least one camera.

In other words, the vehicular environment data comprises image data. This means that information can be processed in a manner that is similar to how a human would process information, thereby enabling the situational awareness data to be better provided to the driver.

In an example, the at least one environment display monitor comprises a monitor configured to display imagery from the at least one camera.

In other words, the imagery, that is displayed on a monitor that the driver can look at to be provided with information, is being processed to determine if there is a risk or danger around the vehicle and on the basis of which a frame around the "video screen" is displayed accordingly.

Thus, for example, cameras could be providing a driver with a bird's eye view of his lorry or car as he is maneuvering the vehicle—for example parking. If the vehicle was approaching a bystander, or a wall or another situation was developing the frame around the display the driver is looking at can change appropriately to indicate to the driver that there is a risk developing.

In an example, the at least one environment display monitor comprises a monitor configured to display vehicle telemetry information.

In other words, the display is a display such as a dashboard display that is showing the vehicle speed, engine speed, engine temperature etc. Thus, the frame around this display indicates to the driver that there is a risk or danger or generally provides situational awareness information relating to that around the vehicle, at an area of the vehicle that the driver frequently looks at.

In an example, the at least one sensor comprises at least one radar sensor.

In other words, the vehicular environment data comprises radar data. This means that day and night and all weather functionality is improved.

In a second aspect, there is provided a vehicle comprising:
an apparatus for providing vehicular environment information according to the first aspect.

In a third aspect, there is provided a method for providing vehicular environment information, comprising:
a) acquiring with at least one sensor vehicular environment data that is external to a vehicle;
c) providing to a processing unit the vehicular environment data;
e) determining with the processing unit vehicular environment information,
wherein the determination of the vehicular environment information comprises use of the vehicular environment data; and
the processing unit is configured to provide at least a portion of a frame around an environment display monitor, that is configured to provide information to a driver of the vehicle, on the basis of the vehicular environment information.

The above aspects and examples will become apparent from and be elucidated with reference to the embodiments described hereinafter.

Exemplary embodiments will be described in the following with reference to the following drawings.

DETAILED DESCRIPTION

Figure 1:
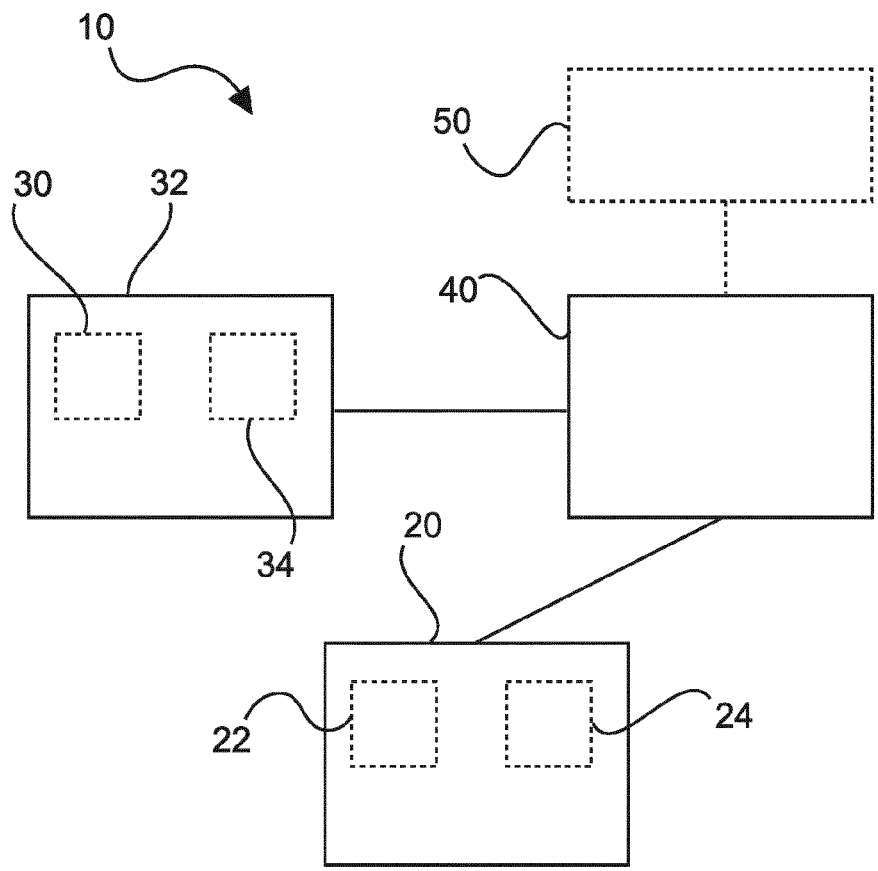
FIG. 1 shows a schematic representation of an example of an apparatus for providing vehicular environment information.

FIG. 1 shows an apparatus 10 for providing vehicular environment information. The apparatus 10 comprises at least one environment display monitor 20, at least one sensor 30, and a processing unit 40. The at least one environment display monitor 20 is configured to provide information to a driver of a vehicle. This is via visual information, but could be via audio and/or haptic (touch feedback) information. The at least one sensor 30 is configured to acquire vehicular environment data that is external to a vehicle 100. The apparatus 10 could be retro-fitted to an existing vehicle 100. The at least one sensor 30 is configured to provide the vehicular environment data to the processing unit 40. This is done via wireless or wired communication. The processing unit 40 is configured to determine vehicular environment information. The determination of the vehicular environment information comprises use of the vehicular environment data. The Processing unit 40 is also configured to provide at least a portion of a frame around the environment display monitor 20 on the basis of the vehicular environment information. It achieves this by passing appropriate data to the environment display monitor 20 via wired or wireless communication.

In an example, the processing unit on the basis of the vehicular environment information is configured to provide an output useable by an output unit to provide an audible warning, such as a beep or buzzer or horn sounding. In an example, the processing unit on the basis of the vehicular environment information is configured to provide an output useable by an output unit to provide a haptic warning. This could be shaking of the steering wheel, vibration of the seat, of gear shift level for example.

In an example, a monitor of the at least one environment display monitor is a mirror replacement monitor. In this way the driver of a vehicle is effectively provided with the information required to assess risk or dangers posed from situates occurring external to the vehicle whilst using a monitor as a replacement mirror.

In an example, a monitor of the at least one monitor could be an analogue or digital dashboard display, and the frame around the monitor could be provided by LED lighting or other light sources. The processing unit is then configured to power the lights appropriately such that a frame is provided around at least a portion of the display.

In an example, a monitor could be an analogue or digital image display unit, and the frame around the monitor could be provided by LED lighting or other light sources. The processing unit is then configured to power the lights appropriately such that a frame is provided around at least a portion of the display.

In an example, a completely digital solution can be provided, where the display is a digital display and the frame is provided as part of a GUI presenting information on the display.

According to an example, the apparatus comprises at least one input unit 50. The at least one input unit 50 is configured to acquire driver intention data. The at least one input unit 50 is configured to provide the driver intention data to the processing unit 40. This is done via wired or wireless communication. The determination of the vehicular environment information comprises use of the driver intention data.

According to an example, the vehicular environment information comprises information relating to a region around the vehicle, and wherein a position of the region around the vehicle is correlated with a position of the portion of frame around the environment display monitor.

According to an example, the vehicular environment information comprises information relating to a level of risk, and wherein the level of risk is correlated with a mode of display of the portion of frame around the environmental display monitor.

According to an example, the mode of display comprises a change in color comprising at least one color.

According to an example, the at least one sensor 30 comprises at least one camera 32.

In an example, the camera is a visible camera. In other words, the camera can sense rays in the visible frequency range, like photographic cameras. In an example, the camera is an infrared camera. In other words, the camera can sense rays in the infrared frequency range. In an example, the infrared camera has an integrated lighting element and therefore can enhance operation during the night, but in other examples the infrared camera does not have such an integrated lighting element. The infrared camera may have a lower color resolution than a visible camera, however the skilled will appreciate what type of camera to use and indeed a visible camera and an infrared camera can be used together, which could be integrated into a single camera.

In this manner, scene information can be processed to determine the identity of objects with high degrees of confidence. In an example, the camera is a far field camera.

According to an example, the at least one environment display monitor 20 comprises a monitor 22 configured to display imagery from the at least one camera 32.

In an example, the monitor configured to display imagery from the at least one camera is a mirror replacement monitor.

According to an example, the at least one environment display monitor 20 comprises a monitor 24 configured to display vehicle telemetry information.

In an example, the monitor that displays imagery from a camera can be the same monitor that displays vehicle telemetry data.

According to an example, the at least one sensor 30 comprises at least one radar sensor 34.

In an example, the radar sensor is a far field radar sensor.

In an example, the apparatus is integrated into a vehicle.

Figure 2:
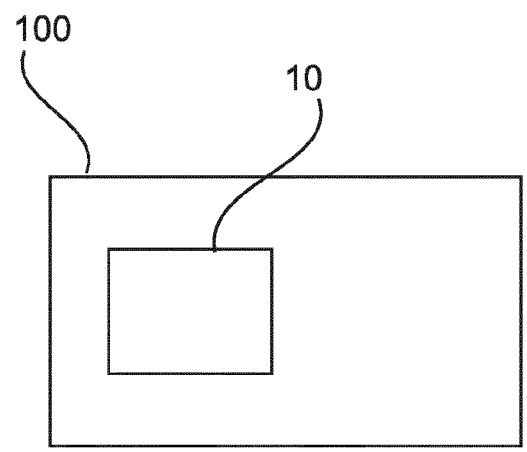
FIG. 2 shows a schematic representation of an example of a vehicle with an apparatus for providing vehicular environment information.

FIG. 2 shows a vehicle 100. The vehicle comprises an apparatus 10 for providing vehicular environment information as described with respect to FIG. 1.

Figure 3:
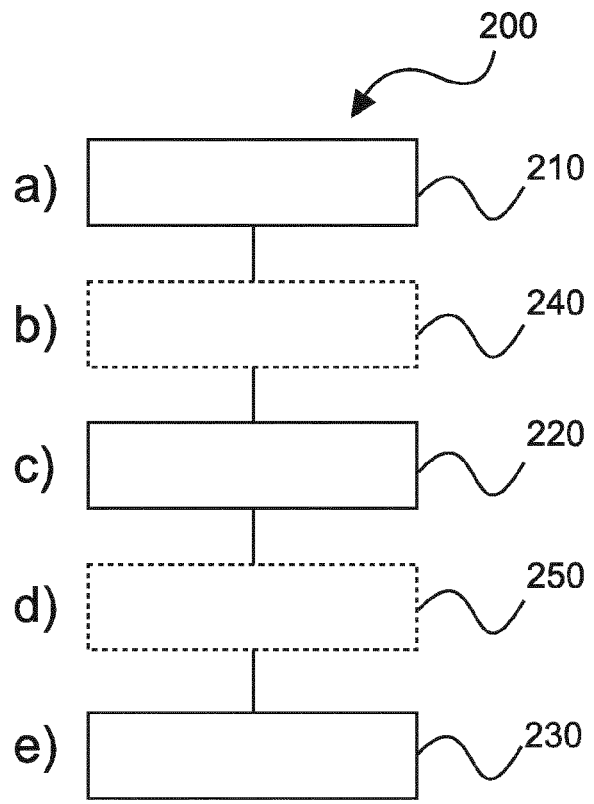
FIG. 3 shows a method for providing vehicular environment information.

FIG. 3 shows a method 200 for providing vehicular environment information in its basic steps. The method comprising:
in an acquiring step 210, also referred to as step a), acquiring with at least one sensor 30 vehicular environment data that is external to a vehicle;
in a providing step 220, also referred to as step c), providing to a processing unit 40 the vehicular environment data;
in a determining step 230, also referred to as step e), determining with the processing unit 40 vehicular environment information, wherein the determination of the vehicular environment information comprises use of the vehicular environment data; and
the processing unit is configured to provide at least a portion of a frame around an environment display monitor 20, that is configured to provide information to a driver of the vehicle, on the basis of the vehicular environment information.

In an example, the method comprises:
in an acquiring step 240, also referred to as step b), acquiring with at least one input unit 50 driver intention data;
in a providing step 250, also referred to as step d), providing to the processing unit 40 the driver intention data; and
wherein, step e) comprises use of the driver intention data.

Figure 4:
FIG. 4 shows an example of the operation of the apparatus for providing vehicular environment information when operating with a vehicle.
Figure 4:
Figure 5:
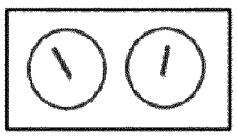
FIG. 5 shows an example of the operation of the apparatus for providing vehicular environment information when operating with a vehicle.

The apparatus, vehicle and method are now described in more detail with respect to FIG. 4 and FIG. 5. In summary, in a specific example relating to a commercial vehicle, a specific special marking method is provided for given situations, on the basis of data acquired external to the vehicle. In the examples shown in FIG. 4 and FIG. 5, data are acquired by one or more cameras but could be acquired by one or more radar sensors, or a combination of camera and radar sensors. The operation of the system is multistage, in the first stage (normal situation, no warning) the display shows its usual image. In the second or higher stages (specific situation) the image is marked with a colored marking frame around the total image. In the further stages (relating to other types of specific situations) the frame's color turns to another color and optionally further warning signals (audible, haptic) are applied to warn the driver about the specific situation.

Referring to FIG. 4, this shows the operation of the marking method in the case of a simple example solution with 3 stages. The example solution represents a right turning assistant system. When there is no obstacle at the right side of the commercial vehicle/combination, there is no marking provided around a display, and the monitor displays the standard view without any marking. When there is an obstacle at the right side, but no high danger is detected the second stage is active with a first color frame marking at the edge of the image. The color marking can indicate the location of the obstacle by the color frame being presented on the right side of the monitor. When the system both recognizes an obstacle at the right side and a driver intention to turn right (e.g. by turning indicator feedback) the third stage is activated by turning the frame color to second color and optionally apply additional haptic or audible warning to the driver.

FIG. 5 shows the operation of the marking method in the case of another example in the same situation. The difference from that shown in FIG. 4 is that the monitor acts as a dashboard display in stage 1, which displays a different image than at higher stages with differently marked frames around the image.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The LIST OF REFERENCE NUMBERS is as follows:
10 Apparatus for providing vehicular environment information;
20 At least one environment display monitor;
22 A monitor configured to display imagery from the at least one camera;
24 A monitor configured to display vehicle telemetry information;
30 At least one sensor;
32 At least one camera;
34 At least one radar sensor;
40 A processing unit;
50 At least one input unit;
100 Vehicle;
200 A method for providing vehicular environment information;
210 Acquiring with at least one sensor vehicular environment data that is external to a vehicle;
220 Providing to a processing unit the vehicular environment data;
230 determining with the processing unit vehicular environment information, utilizing the vehicular environment data;
240 Acquiring with at least one input unit driver intention data; and
250 Providing to the processing unit the driver intention data.

The invention claimed is:

1. An apparatus for providing vehicular environment information, comprising:
at least one environment display monitor;
at least one sensor; and
a processing unit;
wherein the at least one environment display monitor is configured to provide information to a driver of a vehicle,
wherein the at least one sensor is configured to acquire vehicular environment data that is external to the vehicle,
wherein the at least one sensor is configured to provide the vehicular environment data to the processing unit,
wherein the processing unit is configured to determine vehicular environment information, and wherein the determination of the vehicular environment information includes using the vehicular environment data,
wherein the processing unit is configured to provide at least a portion of a frame around the environment display monitor based on the vehicular environment information,
wherein the frame surrounds an image on the display monitor, and wherein frame characteristics are altered to provide the information to the driver of the vehicle, based on the vehicular environment information,
wherein, the vehicular environment information includes information relating to a level of risk, and wherein the level of risk is correlated with a mode of display of the portion of frame around the environmental display monitor,
wherein the display monitor displays dashboard information in a first stage when there is no risk, a frame having a first characteristic for a first risk level in a second stage, and the frame having a second characteristic for a second risk level in a third stage, and
wherein for changes in risk, the mode of display includes a corresponding change in at least one of a color having at least one color of the frame, a brightness level of the frame, and/or a thickness of the frame.

2. The apparatus of claim 1, further comprising:
at least one input unit;
wherein the at least one input unit is configured to acquire driver intention data,
wherein the at least one input unit is configured to provide the driver intention data to the processing unit, and
wherein the determination of the vehicular environment information includes using the driver intention data.

3. The apparatus of claim 1, wherein the vehicular environment information includes information relating to a region around the vehicle, and wherein a position of the region around the vehicle is correlated with a position of the portion of frame around the environment display monitor.

4. The apparatus of claim 1, wherein the at least one sensor includes at least one camera.

5. The apparatus of claim 4, wherein the at least one environment display monitor includes a monitor to display imagery from the at least one camera.

6. The apparatus of claim 1, wherein the at least one environment display monitor includes a monitor to display vehicle telemetry information.

7. The apparatus of claim 1, wherein the at least one sensor includes at least one radar sensor.

8. A vehicle, comprising:
an apparatus for providing vehicular environment information, including:
at least one environment display monitor;
at least one sensor; and
a processing unit;
wherein the at least one environment display monitor is configured to provide information to a driver of a vehicle,
wherein the at least one sensor is configured to acquire vehicular environment data that is external to the vehicle, wherein the at least one sensor is configured to provide the vehicular environment data to the processing unit, wherein the processing unit is configured to determine vehicular environment information, and wherein the determination of the vehicular environment information includes using the vehicular environment data, and wherein the processing unit is configured to provide at least a portion of a frame around the environment display monitor based on the vehicular environment information, and wherein the frame surrounds an image on the display monitor, and wherein frame characteristics are altered to provide the information to the driver of the vehicle, based on the vehicular environment information, wherein, the vehicular environment information includes information relating to a level of risk, and wherein the level of risk is correlated with a mode of display of the portion of frame around the environmental display monitor, wherein the display monitor displays dashboard information in a first stage when there is no risk, a frame having a first characteristic for a first risk level in a second stage, and the frame having a second characteristic for a second risk level in a third stage, and wherein for changes in risk, the mode of display includes a corresponding change in at least one of a color having at least one color of the frame, a brightness level of the frame, and/or a thickness of the frame.

9. A method for providing vehicular environment information, the method comprising:

acquiring, with at least one sensor, vehicular environment data that is external to a vehicle;

providing the vehicular environment data to a processing unit; and determining, with the processing unit, vehicular environment information, wherein the determination of the vehicular environment information includes using the vehicular environment data;

wherein the processing unit is configured to provide at least a portion of a frame around an environment display monitor that is configured to provide information to a driver of the vehicle, based on the vehicular environment information, and wherein the frame surrounds an image on the display monitor, and wherein frame characteristics are altered to provide the information to the driver of the vehicle, based on the vehicular environment information, wherein, the vehicular environment information includes information relating to a level of risk, and wherein the level of risk is correlated with a mode of display of the portion of frame around the environmental display monitor, wherein the display monitor displays dashboard information in a first stage when there is no risk, a frame having a first characteristic for a first risk level in a second stage, and the frame having a second characteristic for a second risk level in a third stage, and wherein for changes in risk, the mode of display includes a corresponding change in at least one of a color having at least one color of the frame, a brightness level of the frame, and/or a thickness of the frame.

10. The method of claim 9, wherein the frame characteristics include color and/or markings.

11. The apparatus of claim 1, wherein the frame characteristics include color and/or markings.

12. The vehicle of claim 8, wherein the frame characteristics include color and/or markings.

* * * * *